United States Patent
Langer et al.

[15] 3,667,278
[45] June 6, 1972

[54] DIFFERENTIAL THERMAL ANALYSIS CELL ASSEMBLY

[72] Inventors: Horst G. Langer, Wayland, Mass.; Franklin J. Karle, Midland; Earl D. Ayers, Auburn, both of Mich.

[73] Assignee: The Dow Chemical Company, Midland, Mich.

[22] Filed: Oct. 8, 1969

[21] Appl. No.: 864,657

[52] U.S. Cl. .................................................. 73/15 B
[51] Int. Cl. .................................................. G01n 25/00
[58] Field of Search .................................................. 73/15

[56] References Cited

UNITED STATES PATENTS

| | | | |
|---|---|---|---|
| 3,283,560 | 11/1966 | Harden et al. | 73/15 |
| 3,285,053 | 11/1966 | Mazieres | 73/15 |
| 3,303,689 | 2/1967 | Paulik et al. | 73/15 |
| 3,417,604 | 12/1968 | Bean et al. | 73/15 |
| 3,491,581 | 1/1970 | Roberts et al. | 73/15 |

OTHER PUBLICATIONS

Barrall et al. " D.T.A. Apparatus" in Analytical Chemistry Vol. 35 No. 12 Nov. 1963, pp. 1837–1840.

Langer et al. Mass Spectrometric D.T.A. in Analytical Chemistry Vol. 37, No. 3 March 1965 pp. 433 and 434.

*Primary Examiner*—Richard C. Queisser
*Assistant Examiner*—Herbert Goldstein
*Attorney*—Griswold and Burdick and Earl D. Ayers

[57] ABSTRACT

This invention relates to a thermal analysis cell which is capable of supplying meaningful data in a high vacuum and which is particularly useful for operations within a mass spectrometer or similar instrument which allows the heating of samples within the confinement of the mass spectrometer vacuum or adjacent to the ion source. The cell comprises a silver block to guarantee uniform heat throughout the cell. It is insulated against the push-through shaft by a section of boron nitride, which is an excellent thermal insulator, and by sapphire or alumina, for example. The silver cell is equipped with two equal temperature sensing wells containing sample and reference temperature sensing means. The sample itself is loaded into a metal cup which is usually secured to its well, and which contacts the temperature sensing means. A similar cup, usually containing non-reactive material, is inserted in the reference well and contacts its temperature sensing means, usually thermocouple. The cell assembly has a detachable temperature sensing head part. External means are provided for utilizing the output of the reference temperature sensing element for use in controlling the heating of the cell.

10 Claims, 3 Drawing Figures

PATENTED JUN 6 1972 3,667,278

INVENTORS.
Horst G. Langer
Franklin J. Karle
Earl D. Ayers
BY Earl D. Ayers
AGENT

DIFFERENTIAL THERMAL ANALYSIS CELL ASSEMBLY

BACKGROUND OF THE INVENTION

This invention relates to differential thermal analysis cells and particularly to differential thermal analysis cells for use in a high vacuum such as exists inside a mass spectrometer, for example.

A thermal analysis cell which is capable of supplying meaningful data in a high vacuum is particularly useful for operations within a mass spectrometer or similar instrument.

However, even though mass spectrometers are sometimes equipped with devices which allow the heating of samples within the confinement of the mass spectrometer vacuum or within the ion source, and such devices sometimes also allow the measurement of sample temperatures during the heating process, these devices do not allow the operation known as differential thermal analysis.

In differential thermal analysis, it is essential that the sample be heated at a predetermined rate of heating, usually a linear rate, that the sample temperature be known and indicated at all times, and for differential thermal analysis operations the sample temperature be continuously compared with that of an inert material in the same cell.

In the past, this has required that three thermocouples located in the thermal analysis cell be precisely at the same temperature at all times unless a chemical reaction occurs in the sample. Thus, it is also of extreme importance that equal heat transfer is guaranteed from the heat source to the thermal analysis cell, that no temperature gradient exists in the cell itself, that fast heat transfer is provided from the cell to the sample and that each thermocouple remains electrically insulated.

In addition, to make a cell useful it must be possible to load a sample into the cell and introduce the cell with the sample into a mass spectrometer without shutting down the operation of a mass spectrometer or other evacuated systems.

Further, it is desirable to be able to quickly change sample cells and/or the sample cell head area.

A principal object of this invention is to provide an improved differential thermal analysis cell assembly.

Another object of this invention is to provide an improved simplified differential thermal analysis cell assembly which is adapted to be used in a high vacuum.

In accordance with this invention, there is provided a cell assembly for insertion in a high vacuum device. The cell assembly comprises closely but detachably coupled blocks of good thermally conductive metal, such as silver, for example, to guarantee uniform heat throughout the cell, and a push-through shaft part. It is insulated against the push-through shaft by which it is inserted in the mass spectrometer or other high vacuum device by a section of boron nitride or other suitable material which is an excellent thermal insulator. The silver cell assembly is equipped with two equal temperature sensing wells containing the sample thermocouple and the reference thermocouple, respectively. The sample is loaded into a metal cup, pushed into the sample well and secured thereto in contact with its temperature sensing means. This temperature sensing means usually consists of a chromel-alumel or other thermocouple which contacts the sample cup. The thermocouple and sample cup are usually cemented in place in the silver block.

Means are provided whereby a furnace temperature control signal may be derived from the output of the reference cell temperature sensor.

Small sample sizes assure fast and uniform heating of the sample while the temperature sensor contacting the sample cup guarantees fast response to thermal effects in the sample itself.

The cell head and the rest of the cell body fit closely together, but may be detached, permitting new heads to be interchanged with the remainder of the cell assembly.

The only efficient way of heat transfer in a vacuum is by radiation, thus the DTA cell itself is surrounded during operation by a radiative furnace.

The invention, as well as additional objects and advantages thereof, will best be understood when the following detailed description is read in connection with the accompanying drawing, in which.

Figure 1:
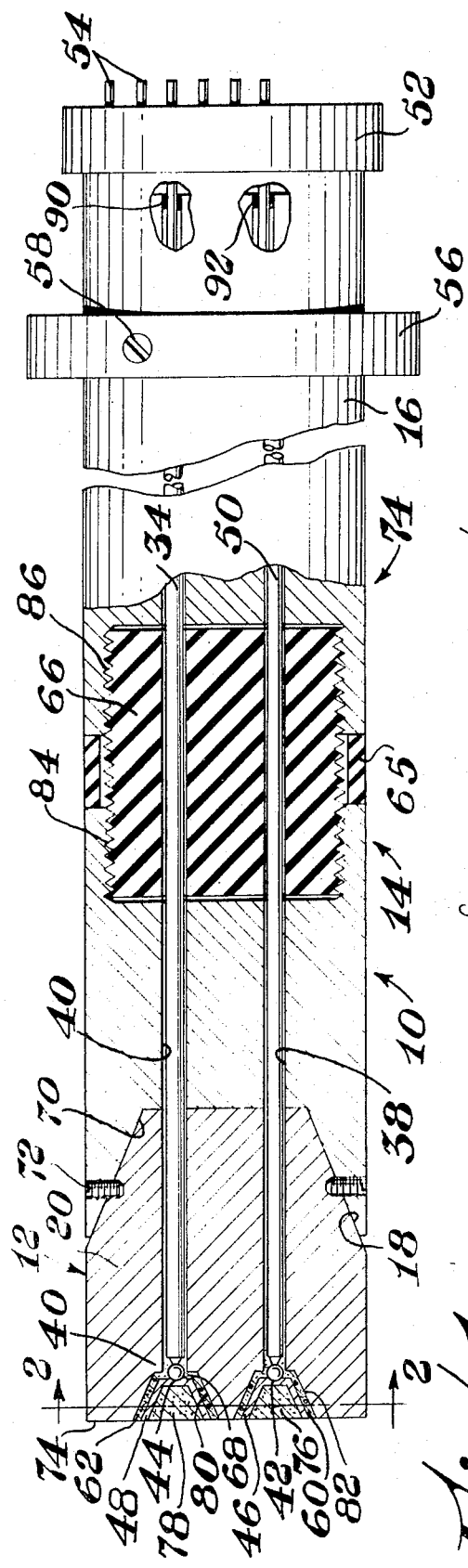
FIG. 1 is a side elevational view, partly broken away and in section, of a differential thermal analysis cell assembly in accordance with this invention.

Referring to the drawing, there is shown a differential thermal analysis cell assembly, indicated generally by the numeral 10.

The assembly 10 comprises a cell head, indicated generally by the numeral 12, a cell body part, indicated generally by the numeral 14, a thermally insulating coupler 66 and a probe rod part 16.

The cell 12 comprises an elongated cylindrical silver block 20 having a flat end 74 and sloping rear end part 18 which contains axial off-center bores 38, 40 which extends inwardly from the end 74 of the silver block 20 and through the coupler 66 and rod part 16. The bores 38, 40 have sloping walled counter bores 82, 80, respectively at their ends which communicate with the end 74 of the block 20.

Thermocouples 42, 44, in bores 38, 40, respectively, similarly have their cable leads 50, 34 extend to the connector 52 and suitable terminal pins 54.

Metal cups 46, 48 shaped to conform with the sloping counterbored parts 82, 80 of bores 38, 40, respectively, are fitted into the counterbored parts 82, 80, respectively and secured in place by suitable cement 60, 62.

The thermocouple 44 is illustrated as having a fusion contact with the cup 48 (see filet 68) while a surface contact only is provided between the cup 46 and thermocouple 42.

Because the cups are identical, either cup may be used as the sample containing cup. The cup used as the reference cup usually is filled with chemically non-reactive material such as particulated alumina, for example, usually cemented in place.

The cell body section 14 is made of a material similar to the cell head, such as silver, for example, and is of generally cylindrical outer configuration.

The body section 14 has one end which has a large diameter sloping walled bore 70 shaped to mate closely with the sloping walled end of the cell head 20. The cell head 20 is held in mating relationship with the body part 14 by means of set screws 72, for example.

The other end of the body part 14 is counterbored to provide an internally threaded coupling part 84.

An electrical and thermally insulating coupling element 66 is conveniently made of boron nitride and is a solid cylindrically shaped element having threaded outer wall surface which engages the threaded part 84 of cell body section 14 and the threaded counterbored part 86 of the probe tube 16.

The probe tube 16 is of cylindrical configuration and has the cables 34, 50 extending therethrough by means of the bores 38, 40 as previously mentioned to terminate at one end to the connector 52 which is coupled to the end of the probe tube 16 which is most remote from the silver block 18. In event the bores 38, 40 are not otherwise sealed, a seal is provided near the connector end (52) of the probe tube 16.

A replaceable gas tight seal 90, 92 is provided between electrical leads 34, 50 and bores 40, 38 at the end of the bores 40, 38, respectively, which are adjacent to the connector 52. This arrangement permits the easy removal of the cell head 20 once the leads are disconnected from the connector 52 and the screws 72 are retracted. Also, this arrangement places the seals 90, 92 at the coolest part of the assembly.

An annular shaped handle and stop member 56 fits over the probe tube 16 and is held in pre-determined position by the set screw 58.

An annular sealing element 65 adapted to fit over the thermal and electrically insulating coupler element 66 provides a gas tight thermally and electrically insulating outer seal between the probe tube 16 and the cell body section 14 as the parts 16 and 14 are tightened on the coupler 66. The outer diameter of the sealing element 65, made of sapphire or other suitable material, for example, is usually the same as the common outer diameter of the tube 16 and body section 14.

The entire assembly 10 is adapted to be inserted into a high vacuum device such as a mass spectrometer, for example through suitable sealable entry means (not shown). The sample and reference cups may be made of silver or other non-reactive metal which is an excellent thermal conductor. A cell probe entry and cell heating means which is especially useful in connection with this and other cell assemblies is disclosed and claimed in F. J. Karle's copending U.S. Pat. application Ser. No. 742,868, entitled "Furnace Assembly for Thermal Analysis Use," filed July 5, 1968.

It has been found that the device satisfies the desired conditions that the temperature sensors (thermocouples) located in the thermal analysis cell should be precisely at the same temperature at all times unless a chemical reaction occurs in the sample; that no temperature gradient exists in the cell itself, and that fast heat transfer is provided from the cell to the sample and that each thermocouple remains electrically insulated.

The identical sample and reference cell cup assemblies help assure that the only difference in the temperature observed by their respective temperature sensors is due to characteristics of the sample material.

The use of a separate cell head and cell body section permits the quick changing of cell heads for use with the rest of the assembly.

Figure 3:
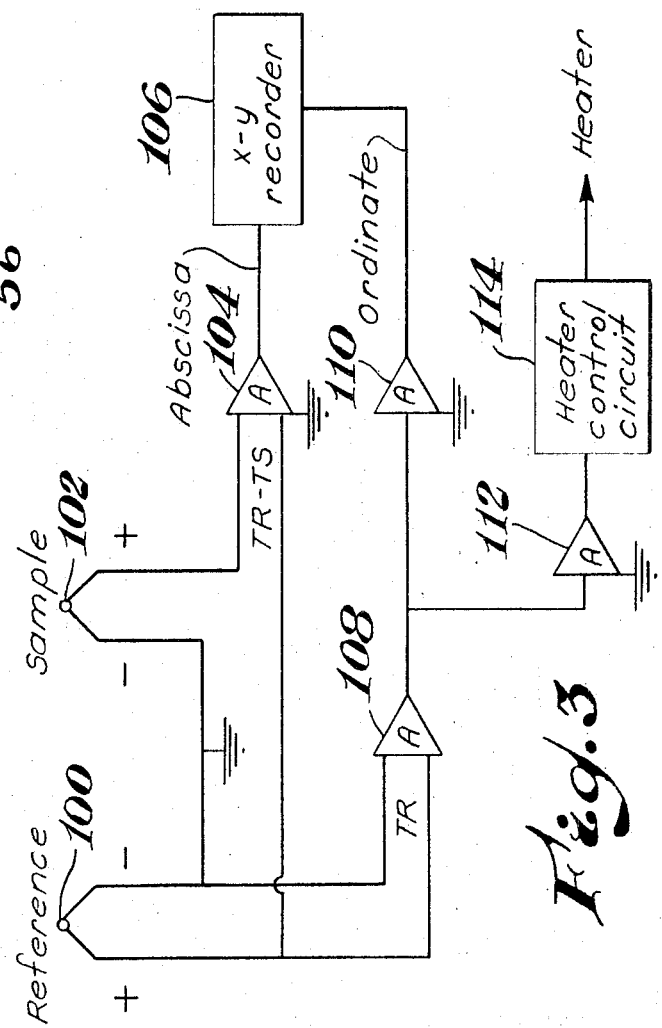
FIG. 3 is a simplified block diagrammatical view showing circuit means for deriving a reference signal and a heating furnace control signal from a single temperature sensor.
Figure 2:
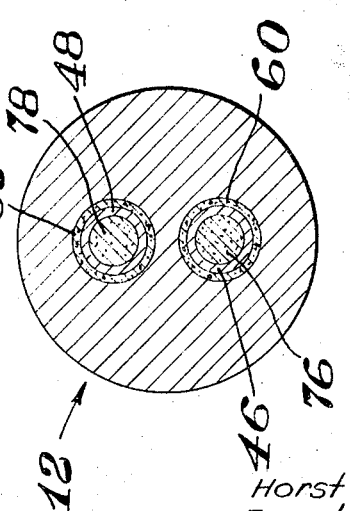
FIG. 2 is a sectional view taken along the line 2—2 of FIG. 1.

Referring to FIG. 3, it may be seen that the outputs of the reference temperature sensor 100 and sample temperature sensor 102 are coupled to the input of a very high input impedance operational amplifier 104 in a subtractive relationship. The output of the amplifier 104 drives the abscissa of an X-Y type recorder 106.

The reference signal is also coupled to a very high input impedance operational amplifier 108 whose output is coupled to the input of very high input impedance amplifiers 110, 112 respectively.

The output of the amplifier 112 is coupled to a heater control circuit 114 which is in turn coupled to the furnace (not shown) used to heat the cell assembly.

The output of amplifier 110 is coupled to the ordinate drive of the X-Y recorder 106.

The very high input impedance of 104, 108, prevents signal interaction which would hinder the use of the reference sensor signal also being used as the furnace control signal (or vice versa). It is assumed that the placement of the second (usually the reference) temperature sensor in the assembly is such that the output signal is suitable as the furnace control signal.

In addition, to make a cell useful it must be possible to load a sample into the cell and introduce the cell with the sample into a mass spectrometer without shutting down the operation of a mass spectrometer or other evacuated systems. This is easily accomplished with cell assemblies in accordance with this invention.

What is claimed is:

1. A differential thermal analysis cell assembly for use under high vacuum conditions, comprising a cell section having a removable cell head part and a body part, the rear end of the head part mating with the forward end of said body part, a thermal isolation section and a probe section, said sections being joined together in the order listed in end to end relationship and having, when so joined, a generally cylindrical configuration with a smooth substantially constant diameter outer surface, said cell section comprising a generally cylindrically shaped part of highly thermally conductive metal having a sample cell receiving bore and a reference cell receiving bore in said head part which extends into said body part 2 each of said bores communicating with a larger diameter bore which extends inwardly from the rear end of said body part, each of said cell receiving bores having sloping walled counterbored parts at their forward ends, each of said sloping walled counterbored parts having disposed therein a cup whose walls mate with said sloping walled parts, said cups each being thermally coupled to said cell head part, a pair of temperature sensing elements, one of said temperature sensing elements being disposed in each of said cell receiving bores and each thermally contacting one of said cups, each of said temperature sensing elements having electrical leads which extend through said cell section, thermal isolation section and probe section, said cell section having coupling means adapted to receive a part of said thermal isolation section, said thermal isolation section comprising an element made of thermal and electrical insulating material which is coupled at its ends to said cell section and to said probe section, said temperature sensing elements being differentially coupled to provide an electrical signal which is a function of the temperatures existing in the cups, and means for splitting the output of the temperature sensor in said reference cell receiving bore into signals which are non-interacting with respect to each other.

2. A cell assembly in accordance with claim 1, wherein said metal cups are substantially identical.

3. A cell assembly in accordance with claim 1, wherein said means for splitting the output of said temperature sensor comprises a pair of very high impedance amplifiers to whose inputs the output of said temperature sensor element thermally coupled to the cup used as a reference is coupled in parallel.

4. A cell assembly in accordance with claim 1, wherein each of said temperature sensing elements is electrically insulated from the other.

5. A cell assembly in accordance with claim 1, wherein said part made of highly thermally conductive metal is made of silver.

6. A cell assembly in accordance with claim 1, wherein said thermal isolation section includes thermal and electrically insulating element sealed between said cell section and said probe section, said annular element having an outer diameter at least approximately the same as the outer diameters of the cell section and probe section.

7. A cell assembly in accordance with claim 1, wherein means are provided for holding said head part and body part in operative positional relationship.

8. A cell assembly in accordance with claim 1, wherein a gas tight seal is provided between said leads said bores extending through said body part extend through said thermal isolation section and said probe section and said leads extend therethrough and are sealed therein.

9. A cell assembly in accordance with claim 1, wherein said cups are fusion sealed to said temperature sensing elements.

10. A cell assembly in accordance with claim 1, wherein said cups mechanically contact said temperature sensing elements.

* * * * *